United States Patent
Bancroft et al.

(10) Patent No.: US 12,338,920 B2
(45) Date of Patent: Jun. 24, 2025

(54) ENHANCED STABILITY GASKET AND COUPLING

(71) Applicant: Victaulic Company, Easton, PA (US)

(72) Inventors: Philip Wayne Bancroft, Belvidere, NJ (US); Matthew A. Bowman, Palmer, PA (US)

(73) Assignee: VICTAULIC COMPANY, Easton, PA (US)

( * ) Notice: Subject to any disclaimer, the term of this patent is extended or adjusted under 35 U.S.C. 154(b) by 150 days.

(21) Appl. No.: 17/954,497

(22) Filed: Sep. 28, 2022

(65) Prior Publication Data
US 2023/0106233 A1  Apr. 6, 2023

Related U.S. Application Data

(60) Provisional application No. 63/251,082, filed on Oct. 1, 2021.

(51) Int. Cl.
*F16L 23/22* (2006.01)
*F16L 23/08* (2006.01)

(52) U.S. Cl.
CPC ............ *F16L 23/22* (2013.01); *F16L 23/08* (2013.01)

(58) Field of Classification Search
CPC . F16L 23/22; F16L 23/08; F16L 23/04; F16L 23/06
USPC ................................. 285/112, 367
See application file for complete search history.

(56) References Cited

U.S. PATENT DOCUMENTS

| | | | |
|---|---|---|---|
| 1,867,891 A | 7/1932 | Reynolds | |
| 3,840,255 A | 10/1974 | Daghe | |
| 4,304,415 A * | 12/1981 | Wolf | F16L 47/065 |
| | | | 277/625 |
| 4,445,533 A * | 5/1984 | DeFrees | F16K 15/035 |
| | | | 137/515.7 |
| 6,139,069 A * | 10/2000 | Radzik | F16L 23/04 |
| | | | 285/112 |
| 7,086,131 B2 | 8/2006 | Gibb et al. | |
| D583,444 S | 12/2008 | Nagle et al. | |
| D583,914 S | 12/2008 | Pierce et al. | |
| D583,916 S | 12/2008 | Madara et al. | |
| D587,347 S | 2/2009 | Madara et al. | |
| D590,923 S | 4/2009 | Nagle et al. | |
| D595,813 S | 7/2009 | Pierce et al. | |

(Continued)

FOREIGN PATENT DOCUMENTS

| | | |
|---|---|---|
| CN | 102597591 A | 7/2012 |
| DE | 925743 C | 3/1955 |

(Continued)

*Primary Examiner* — David Bochna
(74) *Attorney, Agent, or Firm* — Ballard Spahr LLP

(57) ABSTRACT

A coupling for joining pipe elements has cast segments attached end to end surrounding a central space. The segments define a channel that receives a gasket. Side surfaces within the channel have angularly oriented capture surfaces which are engaged by bulbous rims on the gasket which prevent the gasket from being dislodged from the channel when at least one pipe element is inserted into the central space. Side surfaces may also have support surfaces between the capture surfaces. The gasket supports the segments in a preassembled state wherein the segments are in spaced relation sufficient to permit insertion of one or more pipe elements while the segments are attached end to end.

34 Claims, 14 Drawing Sheets

(56) References Cited

U.S. PATENT DOCUMENTS

| | | | |
|---|---|---|---|
| D595,814 S | 7/2009 | Pierce et al. | |
| 7,644,960 B2 * | 1/2010 | Casey, Sr. | F16L 23/22 285/410 |
| 7,712,796 B2 | 5/2010 | Gibb et al. | |
| D621,482 S | 8/2010 | Porter et al. | |
| D621,483 S | 8/2010 | Shah et al. | |
| D629,073 S | 12/2010 | Madara et al. | |
| D629,077 S | 12/2010 | Porter et al. | |
| D629,497 S | 12/2010 | Shah et al. | |
| D634,817 S | 3/2011 | Madara et al. | |
| 7,950,701 B2 | 5/2011 | Dole et al. | |
| 7,988,207 B2 * | 8/2011 | Dole | F16L 17/04 285/112 |
| D651,290 S | 12/2011 | Shah et al. | |
| 8,177,263 B2 | 5/2012 | Dole et al. | |
| 8,424,918 B2 | 4/2013 | Gibb et al. | |
| 8,517,430 B2 | 8/2013 | Dole et al. | |
| 8,646,165 B2 | 2/2014 | Gibb et al. | |
| 8,733,799 B2 | 5/2014 | Gibb et al. | |
| 8,777,277 B2 | 7/2014 | Dole et al. | |
| RE45,304 E | 12/2014 | Dole et al. | |
| 8,979,138 B2 | 3/2015 | Dole et al. | |
| D729,356 S | 5/2015 | Kuehner et al. | |
| 9,039,046 B2 | 5/2015 | Beagen, Jr. | |
| D731,031 S | 6/2015 | Dole et al. | |
| D737,412 S | 8/2015 | Yesavage et al. | |
| D740,921 S | 10/2015 | Kuehner et al. | |
| 9,168,585 B2 * | 10/2015 | Schell | F16L 21/06 |
| 9,182,058 B2 | 11/2015 | Cygler, III et al. | |
| 9,194,516 B2 | 11/2015 | Beagen, Jr. | |
| 9,297,483 B2 | 3/2016 | Wolff | |
| D754,306 S | 4/2016 | Yesavage et al. | |
| D754,307 S | 4/2016 | Dole et al. | |
| 9,404,608 B2 | 8/2016 | Lippka | |
| 9,482,374 B2 | 11/2016 | Henry | |
| 9,500,307 B2 | 11/2016 | Beagen, Jr. | |
| 9,534,715 B2 | 1/2017 | Beagen, Jr. | |
| 9,631,746 B2 | 4/2017 | Beagen, Jr. | |
| 9,726,310 B2 | 8/2017 | Gibb et al. | |
| 10,100,954 B2 * | 10/2018 | Lippka | F16L 21/005 |
| 10,100,957 B2 | 10/2018 | Bowman | |
| 10,190,707 B2 | 1/2019 | Brandt et al. | |
| 10,274,115 B2 | 4/2019 | Beagen, Jr. | |
| 10,288,200 B2 | 5/2019 | Beagen, Jr. | |
| 10,371,295 B2 | 8/2019 | Bowman | |
| 10,385,997 B2 | 8/2019 | Beagen, Jr. | |
| 10,641,421 B2 | 5/2020 | Beagen, Jr. | |
| 10,711,929 B1 | 7/2020 | Lu et al. | |
| 10,851,928 B1 | 12/2020 | Lu et al. | |
| 10,962,152 B2 | 3/2021 | Gibb et al. | |
| 2005/0253383 A1 | 11/2005 | Gibb et al. | |
| 2013/0140811 A1 | 6/2013 | Fahrer et al. | |
| 2018/0347730 A1 | 12/2018 | Bancroft | |
| 2020/0088327 A1 | 3/2020 | Lippka | |
| 2020/0088330 A1 | 3/2020 | Lippka | |
| 2020/0332934 A1 * | 10/2020 | Duncan | F16L 23/08 |

FOREIGN PATENT DOCUMENTS

| | | |
|---|---|---|
| DE | 1806616 A1 | 5/1970 |
| TW | I714632 B | 1/2021 |

* cited by examiner

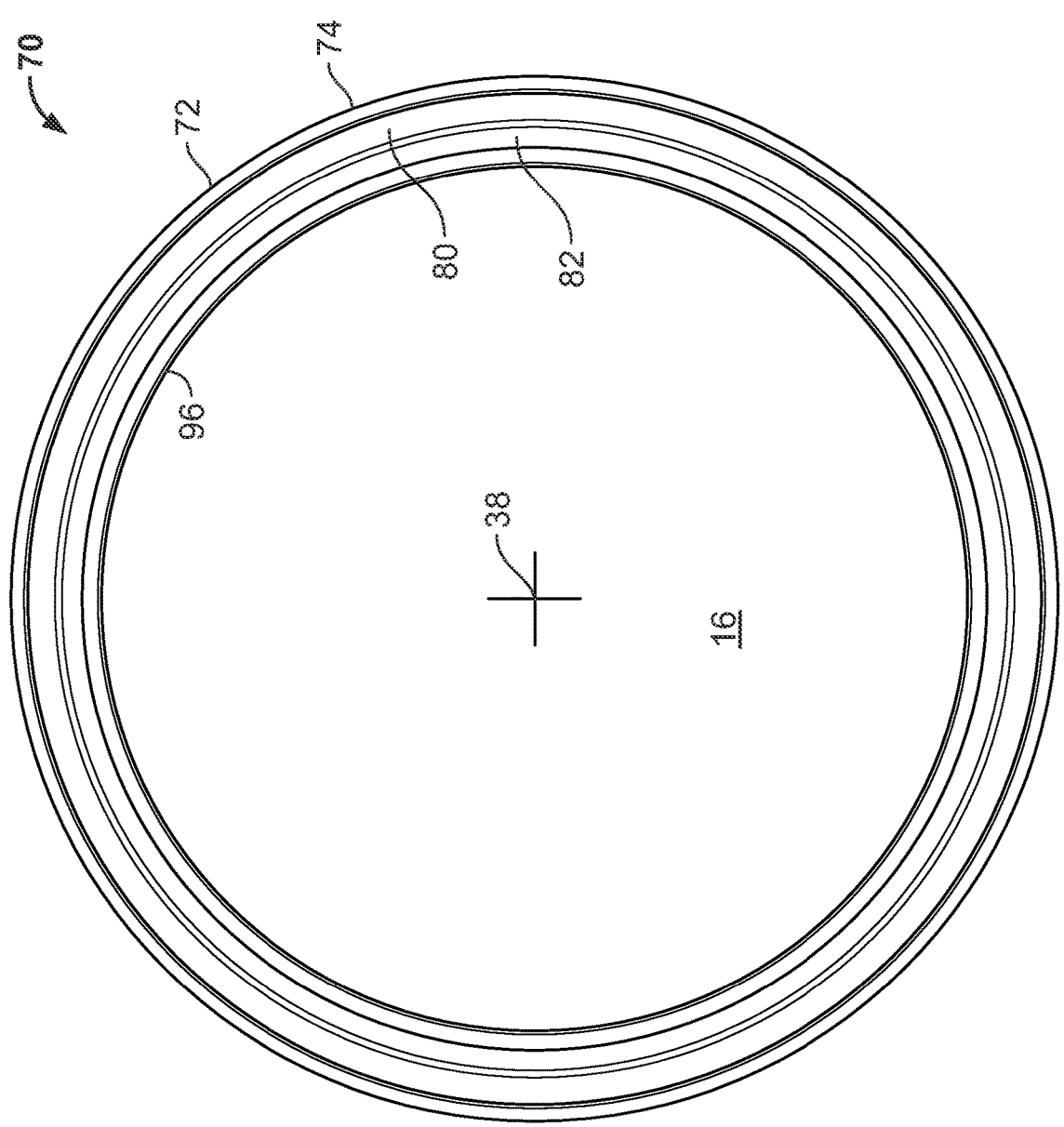

ENHANCED STABILITY GASKET AND COUPLING

CROSS REFERENCE TO RELATED APPLICATIONS

This application is based upon and claims priority to U.S. Provisional Application No. 63/251,082, filed Oct. 1, 2021, which application is hereby incorporated by reference herein.

FIELD OF THE INVENTION

This invention relates to couplings and gaskets for joining pipe elements.

BACKGROUND

Mechanical pipe couplings are used to form piping networks by joining pipe elements to one another or to other components such as valves, fittings and the like. Couplings which comprise segments attached end to end surrounding a central space may come from the factory in what is known as a "preassembled state" wherein the segments are supported in spaced relation sufficient to permit the pipe elements, or at least one pipe element, to be inserted into the coupling without disassembling the coupling's segments from one another. In such "factory preassembled" couplings it is convenient to use a gasket, positioned within the central space and received within a channel defined by the segments, to support the segments in the required spaced relation. The gasket also provides the sealing function necessary to ensure a fluid-tight joint between the coupling and the pipe elements.

One challenge faced by coupling designers is how to prevent the gasket from being dislodged from the channel during pipe element insertion into a coupling in the preassembled state. FIG. 1 shows an example prior art gasket 11 being dislodged from a channel 13 defined by a coupling segment 15 upon insertion of a pipe element 17 into the coupling when in the preassembled state. The side of the gasket opposite the inserted pipe element 17 tends to slide down the inner surface of channel 13. It is believed that this is due to the generous draft angle 19 present as a result of the casting process used to mass produce the segments 15. A dislodged gasket may present problems in forming a fluid tight joint, as it might not be possible to insert the other pipe element 21 so that it seals properly. Furthermore, there is a risk that the gasket could be damaged upon second pipe element insertion. There is clearly an opportunity to improve the design of mechanical pipe couplings and gaskets for better stability and ease of assembling a joint from the preassembled state.

Another design challenge concerns the effects which handling might have on factory preassembled couplings during shipment. The factory preassembled couplings are placed into a shipping container, often one on top of the other, many times in large quantity. Following delivery to the point of final assembly, the coupling is positioned on the pipe ends where one or several fasteners are tightened, and the joint assembly is completed. This process requires that the spaced relation of the segments, as established at the factory, be maintained during shipping to permit insertion of the pipe elements during eventual installation. However, potential exists for some coupling segments to be inadvertently displaced toward each other (compressed), due to contact with other couplings in the shipping container. Thus, at the point of use, some couplings may no longer be in the required spaced relation as established at the factory to ensure that the pipe element or elements may be easily inserted into the factory preassembled coupling. In such cases the installer may have to manually pull the housings apart to return the coupling segments to their intended spaced relation. This action by the installer may remedy the handling issue, but it is advantageous to avoid this step in the assembly process.

SUMMARY

The invention concerns a coupling for joining pipe elements. In an example embodiment the coupling comprises a plurality of segments attached to one another end to end surrounding a central space for receiving the pipe elements. In this example each segment comprises a casting having a back wall, first and second sidewalls attached to the back wall on opposite sides thereof, the back wall and the sidewalls defining a channel, the back wall defining a back surface facing the central space, the sidewalls defining respective first and second side surfaces facing the channel. Each side surface comprises a capture surface adjacent to the back surface. By way of example each capture surface has an orientation angle of 10° or less measured from a reference line extending radially from a longitudinal axis arranged coaxially with the segments through the central space. Each segment may further comprise first and second adjustable attachment assemblies located at opposite ends of the segments for adjustably attaching the segments to one another in end to end relation.

In an example embodiment each segment comprises a relief surface contiguous with the capture surface. The relief surface has an orientation angle greater than 5° measured from a reference line extending radially from the longitudinal axis. Further by way of example the orientation angle of the capture surfaces ranges from 10° to 1°. In a particular example embodiment the orientation angle of the capture surface is 5°. Further by way of example the orientation angle of the relief surface ranges from 5° to 10°. In an example embodiment the capture surface comprises from 50% to 100% of a depth of each of the first and second sidewalls. In a specific example, the capture surface comprises 50% of a depth of each of the first and second sidewalls. In a further example the relief surface comprises from 75% to 0% of a depth of each of the first and second sidewalls. In another example the relief surface comprises 50% of a depth of each of the first and second sidewalls.

An example embodiment may comprise, at most, a first and a second of the segments. The first adjustable attachment assembly on the first segment is in facing relation with the first adjustable attachment assembly on the second segment and the second adjustable attachment assembly on the first segment is in facing relation with the second adjustable attachment assembly on the second segment.

In an example embodiment each attachment may assembly comprise a respective lug defining an opening and a respective adjustable fastener received within the openings, wherein the fasteners extend between the lugs for adjustably attaching the segments to one another.

By way of further example, each segment may comprise a first contact surface positioned adjacent to the first attachment assembly and a second contact surface positioned adjacent to the second attachment assembly, the first contact surface on the first segment being in facing relation with the first contact surface on the second segment, and the second contact surface on the first segment being in facing relation with the second contact surface on the second segment. In an example the first and second contact surfaces are angularly oriented and have opposite slopes such that contact between the first and second contact surfaces causes the segments to rotate in opposite directions to one another about a rotation axis perpendicular to the longitudinal axis.

An example embodiment according to the invention may further comprise a gasket. An example gasket comprises a web forming a circular loop received within the channel. A first bulbous rim extends circumferentially around a first side of the web. The first bulbous rim projects toward the back wall and the first sidewall. A second bulbous rim extends circumferentially around a second side of the web opposite to the first side. The second bulbous rim projects toward the back wall and the second sidewall. A first lobe is attached to the first side of the web. The first lobe extends circumferentially around the loop and projecting toward the central space. The first lobe defines a first sealing surface at a free end thereof. The first sealing surface is engageable with one of the pipe elements received within the central space. A second lobe is attached to the second side of the web. The second lobe extends circumferentially around the loop and projects toward the central space. The second lobe defines a second sealing surface at a free end thereof. The second sealing surface is engageable with one of the pipe elements received within the central space. The first bulbous rim engages the capture surface on the first side surface and the second bulbous rim engages the capture surface on the second side surface thereby supporting the segments in a factory preassembled state such that the segments are supported in spaced relation from one another sufficient to permit insertion of the pipe elements into the central space while the segments are attached to one another end to end surrounding the central space.

The gasket may further comprise a leg positioned between the first and second lobes. The leg projects from the web toward the central space. In an example embodiment the leg further comprises a plurality of discrete tabs positioned on an inner perimeter of the leg and projecting toward the central space. The tabs are arranged in spaced relation from one another along the inner perimeter. In one example embodiment the tabs have a curved profile. Further by way of example, the web has a perimetral surface facing away from the central space, the perimetral surface being concave.

Additionally by way of example the gasket may further comprise first and second glands extending respectively from the first and second lobes. In an example embodiment the first and second bulbous rims extend continuously about the first and second sides of the web respectively.

According to an example, each capture surface comprises a first and a second portion, the first capture surface portions being positioned proximate to the first adjustable attachment assembly, the second capture surface portions being positioned proximate to the second adjustable attachment assembly. By way of example the first capture surface portion may subtend an angle ranging from 25° to 45° and the second capture surface portion may subtend an angle ranging from 25° to 45° measured about the longitudinal axis.

In an example coupling according to the invention each first and second side surface may further comprise respective first and second support surfaces adjacent to the back surface. The first support surface is positioned between the first and second capture surface portions on the first side surface, the second support surface is positioned between the first and second capture surface portions on the second side surface. The first support surface has an orientation angle different from the orientation angles of the first and second capture surface portions on the first side surface. The second support surface has an orientation angle different from the orientation angles of the first and second capture surface portions on the second side surface.

In an example embodiment the first and second support surfaces each have an orientation angle ranging from 15° to 30° measured from respective first and second reference lines extending radially from the longitudinal axis. Further by way of example the first support surface may subtend an angle ranging from 90° to 110° measured about the longitudinal axis and the second support surface subtends an angle ranging from 90° to 110° measured about the longitudinal axis.

In an example embodiment each capture surface comprises a first and a second portion. The first capture surface portion is positioned proximate to the first adjustable attachment assembly, the second capture surface portion is positioned proximate to the second adjustable attachment assembly. Each first and second side surfaces may further comprise respective first and second support surfaces adjacent to the back surface. The first support surface is positioned between the first and second capture surface portions on the first side surface, the second support surface is positioned between the first and second capture surface portions on the second side surface. The first support surface has an orientation angle different from the orientation angles of the first and second capture surface portions on the first side surface and the second support surface has an orientation angle different from the orientation angles of the first and second capture surface potions on the second side surface.

Another example coupling embodiment further comprises a gasket, the gasket comprising a web forming a circular loop received within the channel. A first bulbous rim extends circumferentially around a first side of the web. The first bulbous rim projects toward the back wall and the first sidewall. A second bulbous rim extends circumferentially around a second side of the web opposite to the first side. The second bulbous rim projects toward the back wall and the second sidewall. A first lobe is attached to the first side of the web by way of example. The first lobe extends circumferentially around the loop and projects toward the central space. The first lobe defines a first sealing surface at a free end thereof. The first sealing surface is engageable with one of the pipe elements received within the central space. A second lobe is attached to the second side of the web. The second lobe extends circumferentially around the loop and projecting toward the central space. The second lobe defines a second sealing surface at a free end thereof. The second sealing surface is engageable with one of the pipe elements received within the central space in this example.

In an example embodiment, when the coupling is in a factory preassembled state, the web and the first and second bulbous rims engage the back surfaces of the segments along the first and second capture surface portions, and the first lobe and the first bulbous rim engages the first support surface and the second lobe and the second bulbous rim engages the second support surface. In this example engagement between the gasket and the segments supports the segments in the factory preassembled state such that the segments are maintained in spaced relation from one another sufficient to permit insertion of the pipe elements into the central space while the segments are attached to one another end to end surrounding the central space.

In an example embodiment the first and second support surfaces each have an orientation angle ranging from 15° to 30° measured from respective first and second reference lines extending radially from the longitudinal axis. Further by way of example the first capture surface portion subtends an angle ranging from 25° to 45° and the second capture surface portion subtends an angle ranging from 25° to 45° measured about the longitudinal axis. In another example embodiment the first support surface subtends an angle ranging from 90° to 110° measured about the longitudinal axis and the second support surface subtends an angle ranging from 90° to 110° measured about the longitudinal axis.

The invention further encompasses a gasket. In an example embodiment the gasket comprises a web forming a circular loop surrounding a central space. A first bulbous rim extends circumferentially around a first side of the web. The first bulbous rim projects both radially and axially with respect to an axis arranged coaxially with the circular loop. A second bulbous rim extends circumferentially around a second side of the web opposite to the first side. The second bulbous rim projects both radially and axially with respect to the axis. A first lobe is attached to the first side of the web. The first lobe extends circumferentially around the loop and projecting toward the central space. The first lobe defining a first sealing surface at a free end thereof. A second lobe is attached to the second side of the web. The second lobe extends circumferentially around the loop and projecting toward the central space. The second lobe defines a second sealing surface at a free end thereof.

In a further example embodiment the gasket according to the invention comprises a leg positioned between the first and second lobes. The leg projects from the web toward the central space. Also by way of example the leg may further comprise a plurality of discrete tabs positioned on an inner perimeter of the leg and projecting toward the central space. The tabs are arranged in spaced relation from one another along the inner perimeter. In an example embodiment the tabs have a curved profile. Further by way of example the web has a perimetral surface facing away from the central space, the perimetral surface being concave. First and second glands may extend respectively from the first and second lobes in an example embodiment. In a further example, the first and second bulbous rims may extend continuously about the first and second sides of the web respectively.

BRIEF DESCRIPTION OF THE DRAWINGS

FIG. 5 is an axial view of an example gasket according to the invention;

DETAILED DESCRIPTION

Figure 2:
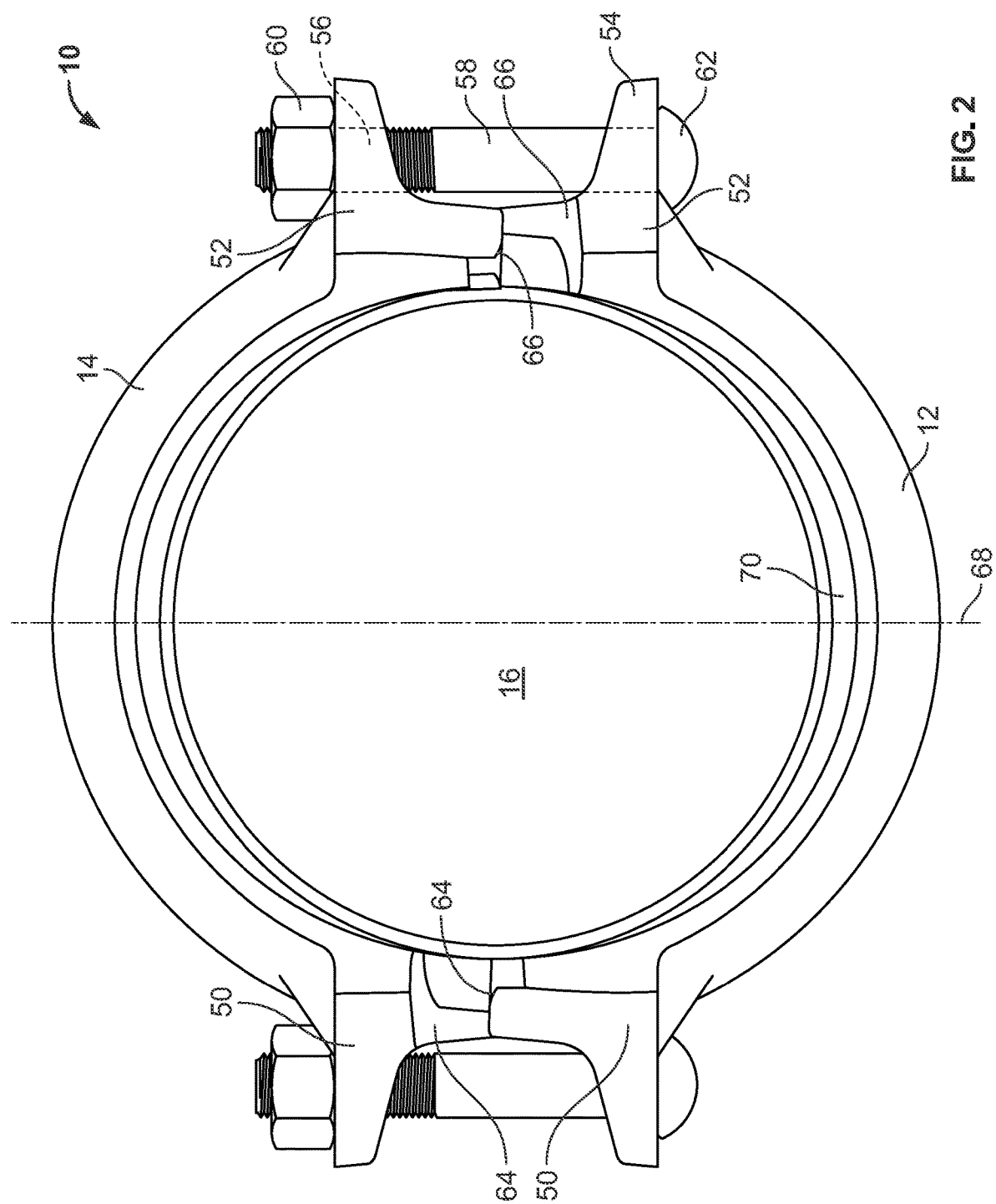
FIG. 2 is an axial view of an example pipe coupling according to the invention shown in the preassembled state.
Figure 3:
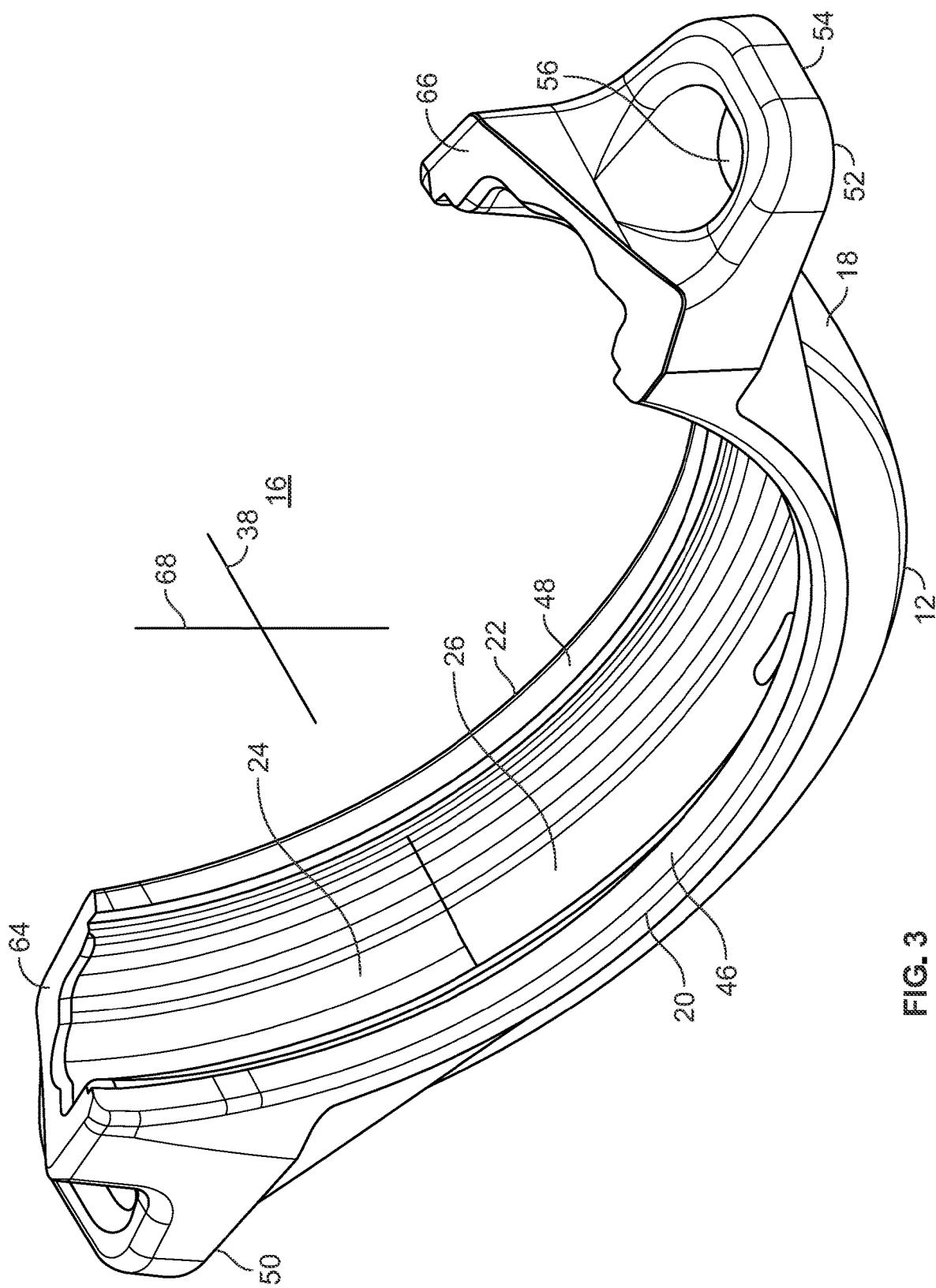
FIG. 3 is an isometric view of an example pipe coupling segment according to the invention.
Figure 4:
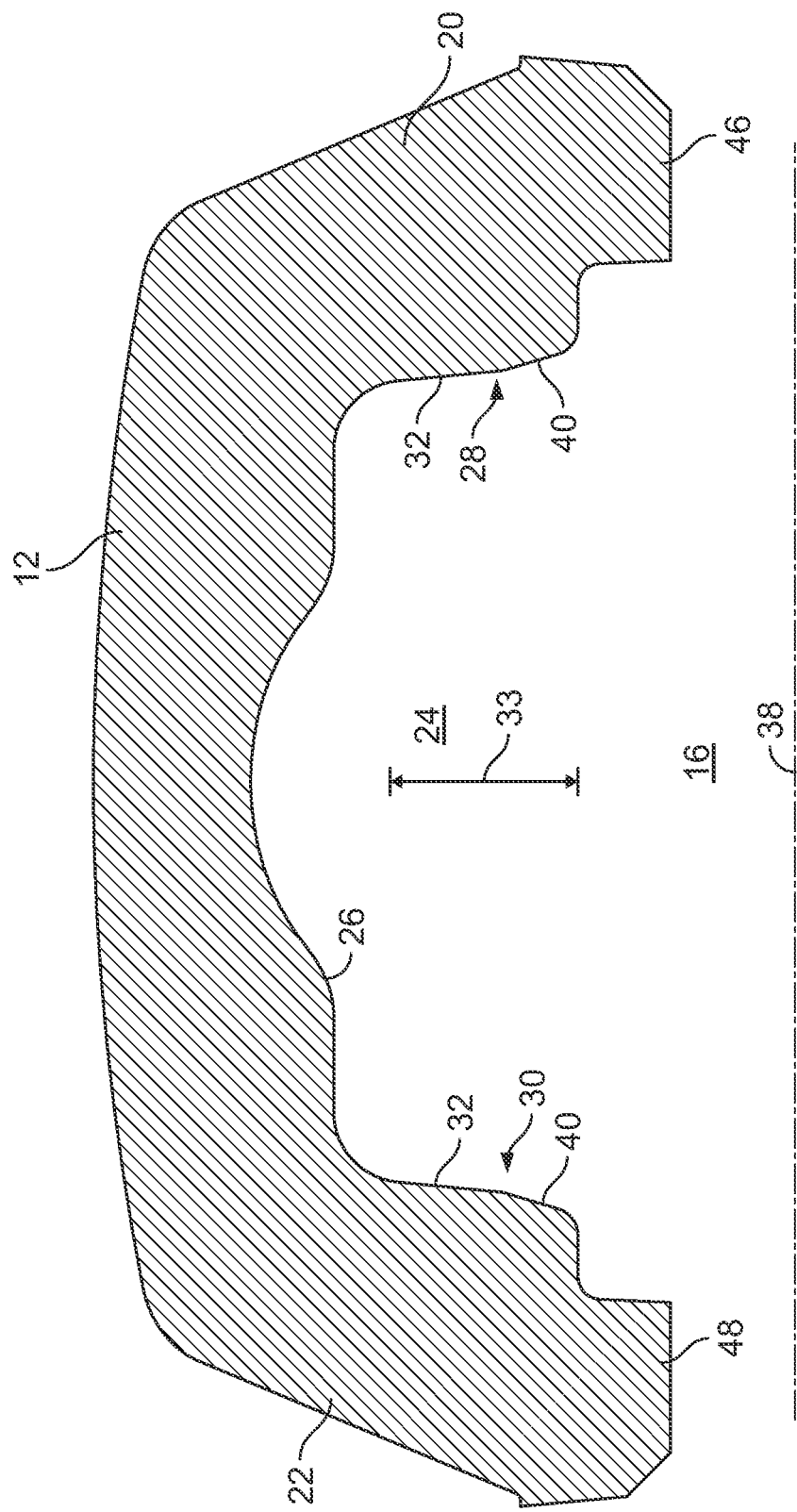
FIG. 4 is a cross sectional view of the example segment shown in FIG. 3.
Figure 4A:
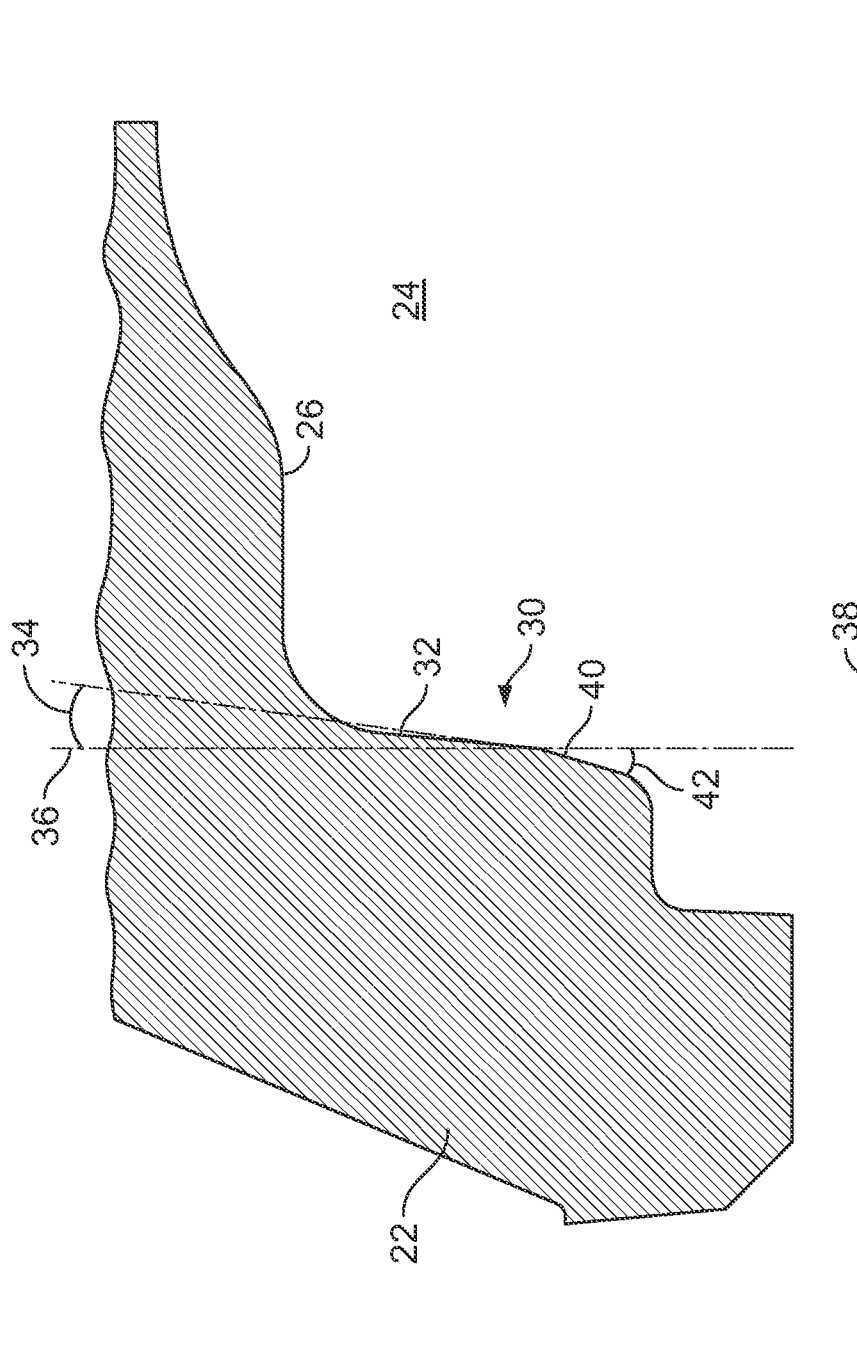
FIG. 4A is a partial sectional view on an enlarged scale taken from FIG. 4.

FIG. 2 shows an example coupling 10 for joining pipe elements. Coupling 10 comprises a plurality of segments, in this example, first and second segments 12 and 14 attached to one another end to end surrounding a central space 16 for receiving the pipe elements. As shown in FIG. 3, each segment (12 shown) comprises a back wall 18 and first and second sidewalls 20, 22 attached to the back wall on opposite sides thereof. The back wall 18 and the sidewalls 20, 22 define a channel 24, the back wall defining a back surface 26 facing the central space 16. As shown in FIG. 4, sidewalls 20 and 22 define respective first and second side surfaces 28, 30 facing the channel 24. Each side surface 28, 30, comprises a capture surface 32 adjacent to the back surface 26. As shown in FIG. 4A, each capture surface 32 has an orientation angle 34 of 10° or less measured from a reference line 36 extending radially from a longitudinal axis 38 arranged coaxially with the segments 12, 14 through the central space 16. In a practical example embodiment, the orientation angle 34 of the capture surface 32 may range from approximately 10° to approximately 1°. An orientation angle 34 of approximately 5° is expected to be beneficial. As segments 12 and 14 are advantageously cast for economical mass production, the relatively small orientation angle 34 of the capture surface 32 has been shown to provide adequate mold draft while also improving gasket stability during pipe element insertion as described below.

As shown in FIG. 4, each side surface 28, 30 may also comprise a relief surface 40 contiguous with the capture surface 32. As shown in FIG. 4A, the relief surface 40, when present, advantageously has an orientation angle 42 greater than 5° measured from the reference line 36 extending radially from the longitudinal axis 38. The orientation angle 42 of the relief surface 40 advantageously ranges from approximately 15° to approximately 30° and is coordinated with the orientation angle 34 of the capture surface 32 to provide a "lead in" for ease of coupling assembly as described below.

As suggested in FIG. 4, the capture and relief surfaces 32 and 40 may occupy a range of portions of the side surfaces 28 and 30, measured as a percentage of the depth 33 of the first and second side walls 20 and 22. In an example embodiment, the capture surface 32 may comprise about 50% of the depth 33 of the side surfaces (shown), to 100% of the depth 33 (no relief surface). It is expected that a capture surface comprising 50% of the side wall depth 33 will be advantageous. The relief surface 40 competes with the capture surface 32 for percentage depth of the side surfaces 28 and 30, and thus the relief surface may comprise from 0% to approximately 75% of the side wall depth 33. In coordination with the capture surface 32, it is expected that a relief surface 40 comprising 50% of the side wall depth 33 will be advantageous.

As shown in FIGS. 3 and 4, segments 12 and 14 (12 shown) may also comprise first and second arcuate keys 46 and 48 arranged on opposite sides of the segments. Keys 46 and 48 engage circumferential grooves in the pipe elements and provide positive mechanical engagement when forming a joint. As shown in FIGS. 2 and 3, each segment 12, 14 further comprises first and second adjustable attachment assemblies 50 and 52 located at opposite ends of the segments for adjustably attaching the segments to one another in end to end relation about the central space 16. As shown in FIG. 2, the first adjustable attachment assembly 50 on the first segment 12 is in facing relation with the first adjustable attachment assembly 50 on the second segment 14, and, the second adjustable attachment assembly 52 on the first segment 12 is in facing relation with the second adjustable attachment assembly 52 on the second segment 14. In this example embodiment each attachment assembly 50, 52 comprises a respective lug 54 defining an opening 56. As shown in FIG. 2, opening 56 receives a respective adjustable fastener 58, in this example comprising a nut 60 and bolt 62. The fasteners 58 extend between the lugs 54 for adjustably attaching the segments 12, 14 to one another.

As further shown in FIG. 3, it is advantageous if each segment (12 shown) further comprises a first contact surface 64 positioned adjacent to the first attachment assembly 50, and a second contact surface 66 positioned adjacent to the second attachment assembly 52. As shown in FIG. 2, the first contact surface 64 on the first segment 12 is in facing relation with the first contact surface 64 on the second segment 14, and, the second contact surface 66 on the first segment 12 is in facing relation with the second contact surface 66 on the second segment 14. The first and second contact surfaces 64 and 66 are angularly oriented and have opposite slopes such that contact between the first and second contact surfaces 64, 66, which results when the segments are drawn toward one another, causes the segments 12 and 14 to rotate in opposite directions relative to one another about a rotation axis 68 perpendicular to the longitudinal axis 38 (see FIG. 3). Contact surfaces 64 and 66 are used when it is desired to effect a more ridged joint, as described in U.S. Pat. No. 4,611,839, hereby incorporated by reference herein.

As shown in FIGS. 2 and 5, the coupling according to the invention may further comprise a gasket 70. In an example embodiment shown in FIG. 5, gasket 70 comprises a web 72 forming a circular loop 74 received within the channel 24 (see FIGS. 3 and 4). As shown in FIG. 6, gasket 70 comprises a first bulbous rim 76 extending circumferentially around a first side of the web 72 and a second bulbous rim 78 extending circumferentially around a second side of the web opposite to the first side. Bulbous rims 76 and 78 advantageously extend continuously about the first and second sides of the web 72. Furthermore, as shown in FIG. 6, each bulbous rim 76 and 78 projects in a radial direction, as defined by arrows 77, and in opposite axial directions, as defined by arrows 79. The directions 77 and 79 are defined with respect to the longitudinal axis 38 arranged coaxially with the segments 12, 14 through the central space 16 as shown in FIGS. 3, 4 and 6. As shown in FIG. 5, axis 38 is also coaxial with the circular loop 74 when the gasket 70 is positioned within the channel 24 (see also FIGS. 2 and 3). As may be determined from FIG. 4, the projection of bulbous rims 76 and 78 in the radial direction 77 may also be described as projecting toward the back wall 18 when the gasket 70 is within the channel 24. Similarly, the projection of bulbous rims 76 and 78 in the axial direction 79 may also be described as projecting toward the first and second sidewalls 20 and 22 when gasket 70 is within the channel 24.

As shown in FIG. 6, a first lobe 80 is attached to the first side of the web 72 and the first bulbous rim 76. As shown in FIG. 6, an outer surface 87 of the first bulbous rim 76 meets an outer surface 83 of the first lobe 80 at a first obtuse angle 81. The first lobe 80 extends circumferentially around the loop 74 (see also FIG. 5) and projects toward the central space 16. The first lobe 80 defines a first sealing surface 82 at a free end 84 thereof. The first sealing surface 82 is engageable with one of the pipe elements received within the central space 16 as described below.

A second lobe 86 is attached to the second side of the web 72 and the second bulbous rim 78. As shown in FIG. 6, an outer surface 91 of the second bulbous rim 78 meets an outer surface 85 of the second lobe 86 at a second obtuse angle 89. The second lobe 86 extends circumferentially around the loop 74 shown in FIG. 5 and projects toward the central space 16. As shown again with reference to FIG. 6, the second lobe 86 defines a second sealing surface 88 at a free end 90 thereof. Like the first sealing surface 82, the second sealing surface 88 is also engageable with one of the pipe elements received within the central space 16. Sealing of the gasket 70 may be enhanced by the use of first and second glands 92 and 94 extending respectively from the first and second lobes 80 and 86. Glands 92 and 94 permit internal pressure within the central space 16 to act on and pressurize the sealing surfaces 82 and 88 against the pipe elements to effect a higher pressure seal.

Figure 5A:
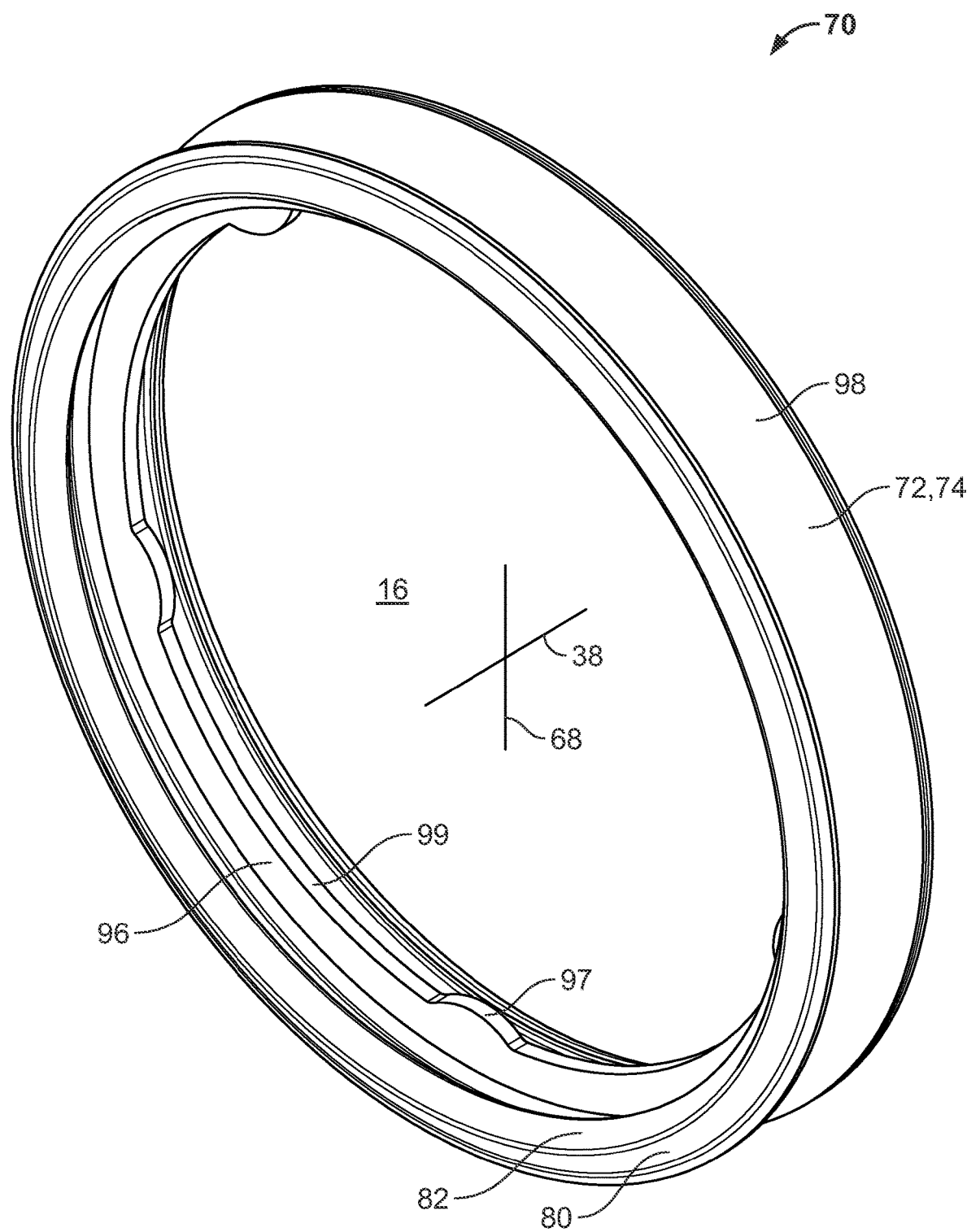
FIG. 5A is an isometric view of another example gasket according to the invention.
Figure 6:
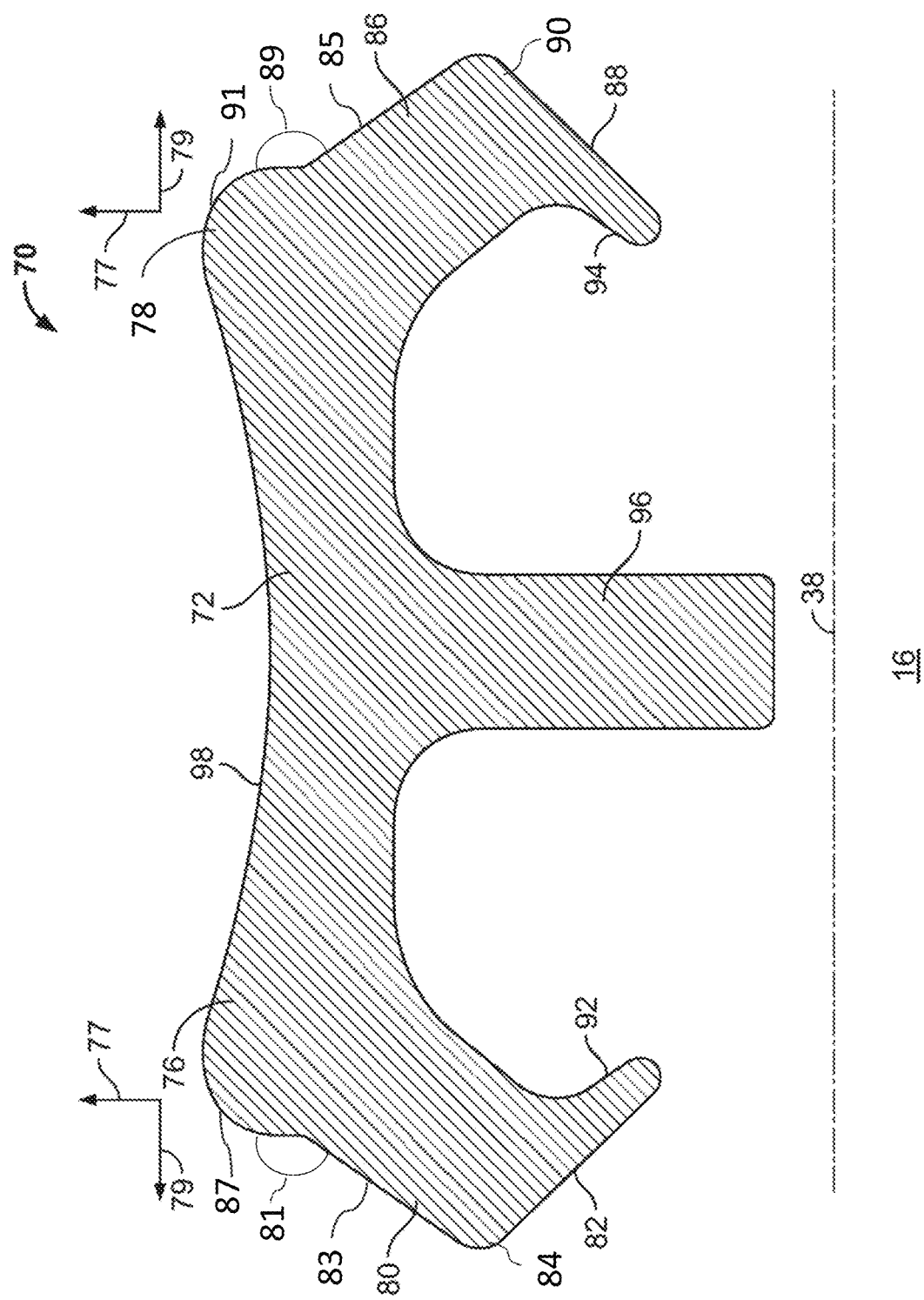
FIG. 6 is a cross sectional view of the example gasket shown in FIG. 5 or 5A.

As shown in FIGS. 5 and 6, gasket 70 may further comprise a leg 96 positioned between the first and second lobes 80 and 86. Leg 96 projects from the web 72 toward the central space 16 and acts as a stop surface to ensure that pipe elements inserted into the central space are inserted to the desired depth. As shown in FIG. 5A, leg 96 may further comprise a plurality of discrete tabs 97 positioned on an inner perimeter 99 of the leg. Tabs 97 project toward the central space 16 and are arranged in spaced relation from one another along the inner perimeter 99. Tabs 97 provide positive and reliable registration within the coupling 10 for pipe elements having beveled ends. It is considered advantageous for tabs 97 to have a curved profile. The curved profile tabs 97 minimize the area of engagement between the leg 96 and the pipe element while still providing sufficient engagement for proper pipe element registration with in the coupling 10. Less engagement between the leg 96 and the pipe element results in smaller pressure head loss within the pipe elements at the joint created by the coupling 10 because the entire inner perimeter 99 does not extend into the fluid flow path and create turbulence and resistance to flow. Any intrusion is limited to portions of the tabs 97. As shown in FIG. 6, the web 72 may also have a perimetral surface 98 facing away from the central space 16. In this example embodiment the perimetral surface 98 is concave.

Figure 7:
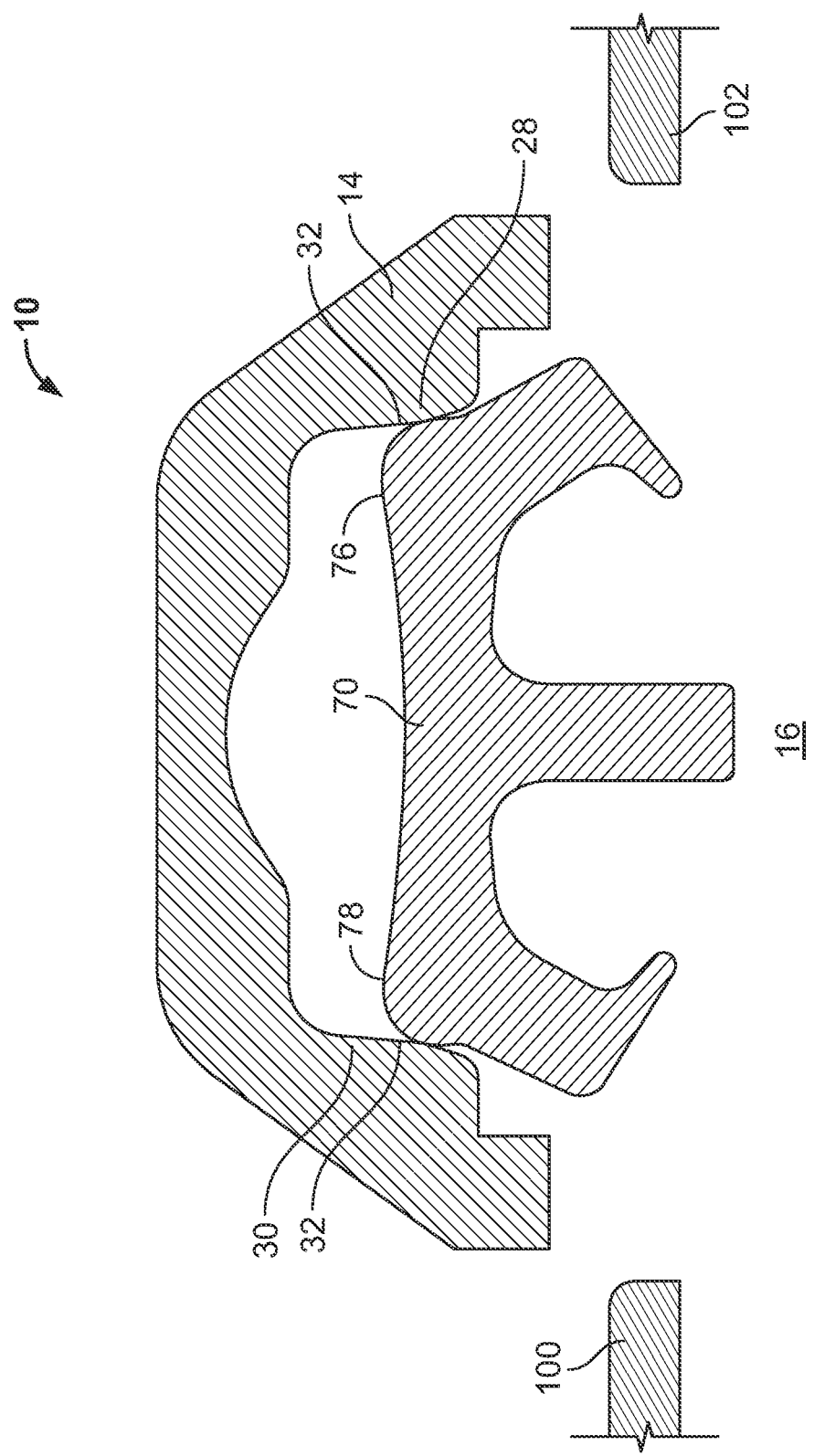
FIGS. 7 through 9 are cross sectional views showing an example coupling and gasket according to the invention in use.
Figure 8:
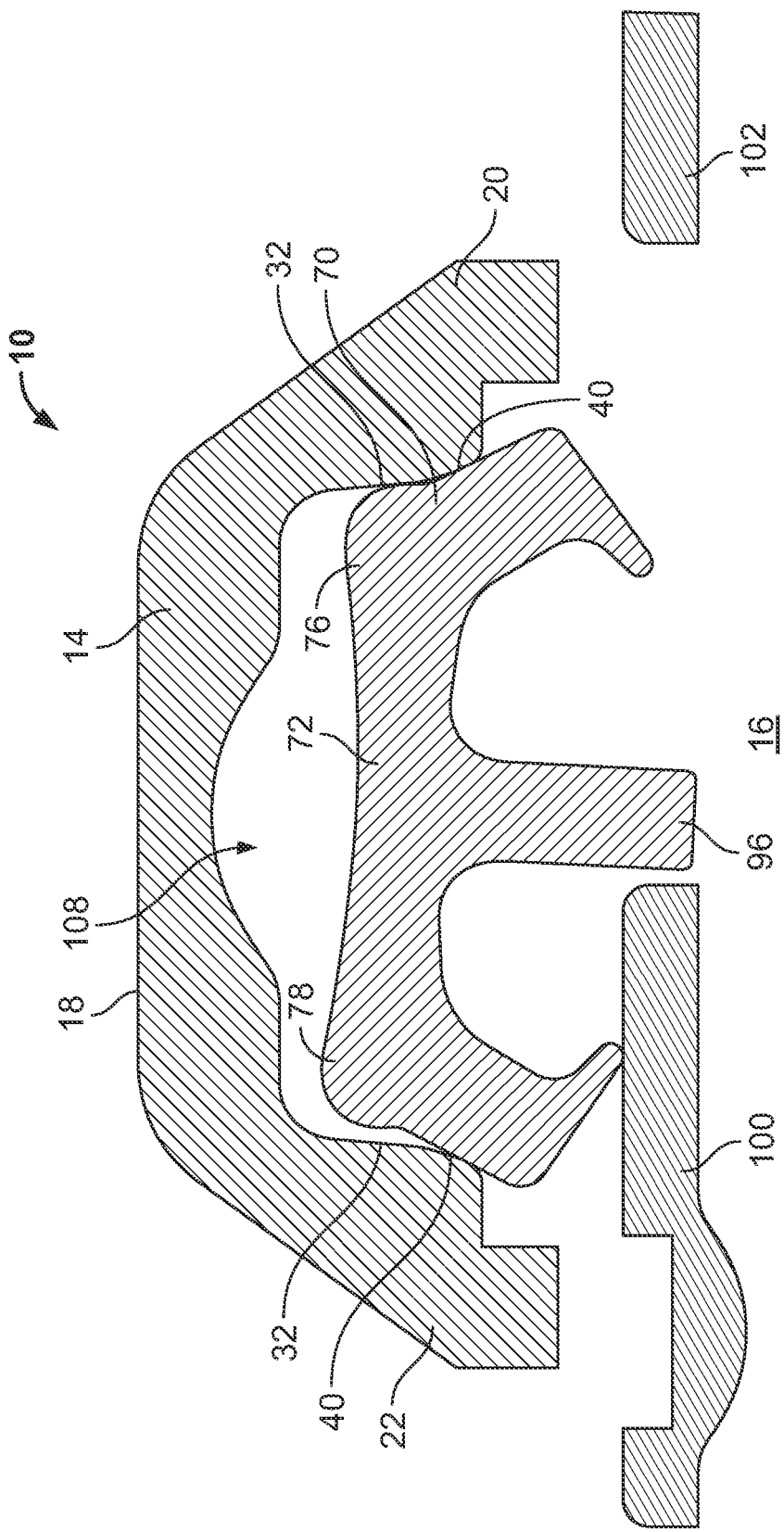
Figure 9:
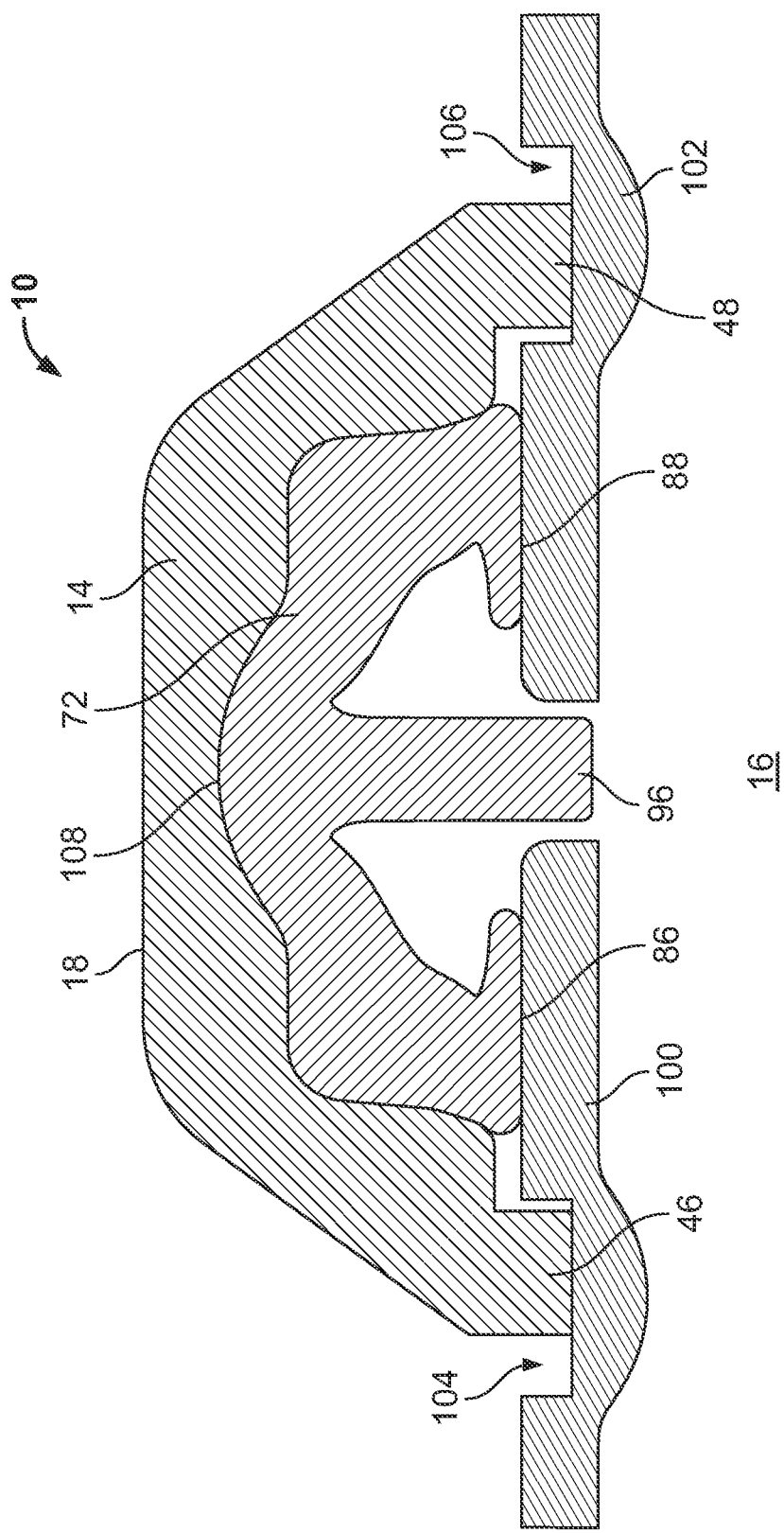

FIGS. 7, 8 and 9 show a portion of the coupling 10 in the "preassembled state". In this configuration the segments 12 and 14 (14 shown) are joined together end to end using the attachment assemblies 50 and 52 on each segment (see FIG. 2) but are held in spaced apart relation sufficient to permit pipe elements 100, 102 to be inserted into the central space 16 (see FIGS. 8 and 9). In this example embodiment, gasket 70 is used to support the segments 12 and 14 in the preassembled state (see also FIG. 2). As shown in FIG. 7, the first bulbous rim 76 engages the first capture surface 32 of first side surface 28 and the second bulbous rim 78 engages the capture surface 32 of the second side surface 30 thereby supporting the segments (14 shown) in a preassembled state such that the segments are supported in spaced relation from one another sufficient to permit insertion of the pipe elements into the central space 16 while the segments are attached to one another end to end surrounding the central space (see FIG. 2).

Figure 1:
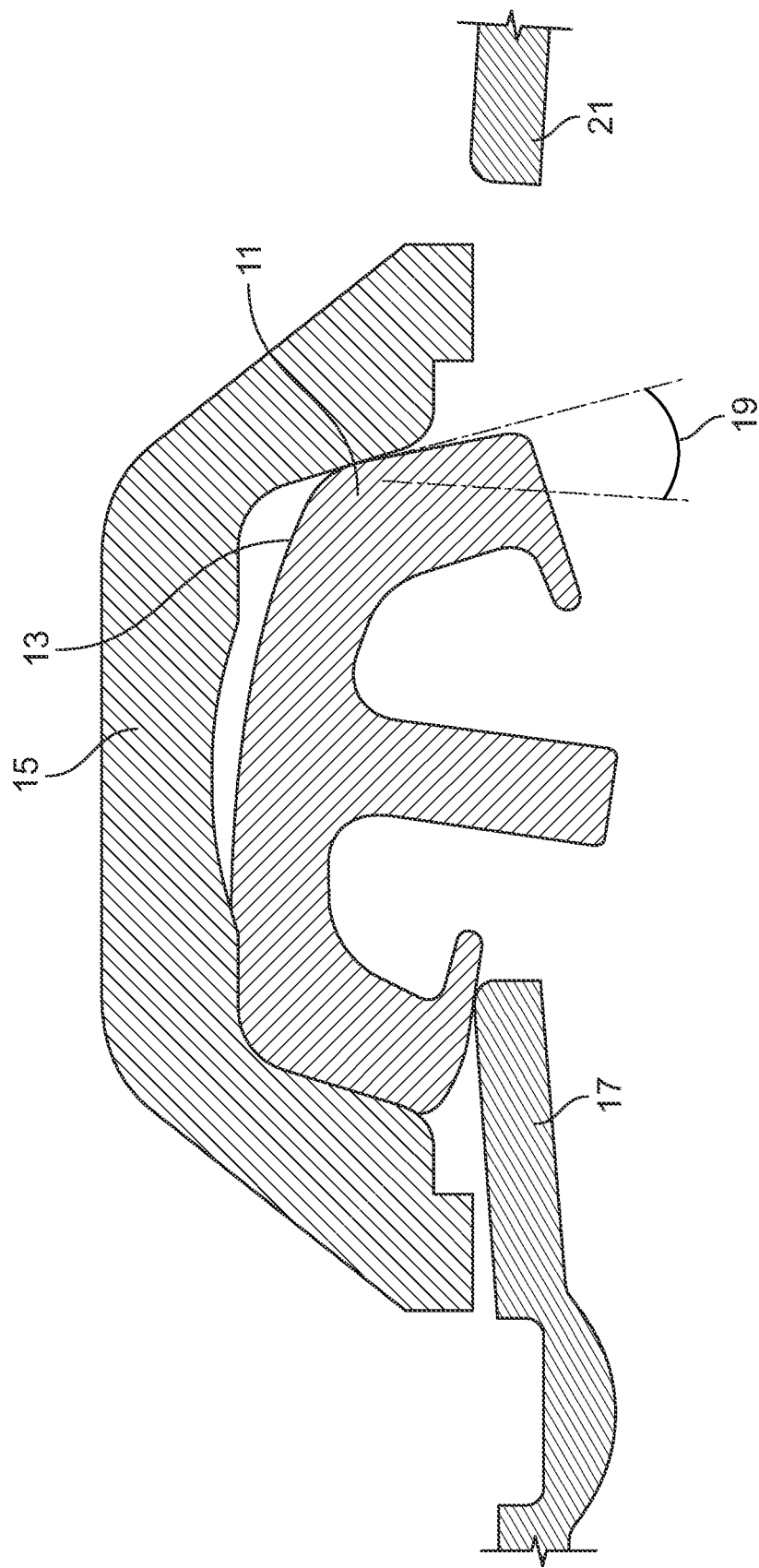
FIG. 1 is a partial cross sectional view of a prior art pipe coupling and gasket.

As shown in FIG. 8, unlike prior art configurations depicted in FIG. 1, dislodgement of the gasket 70 upon insertion of the first pipe element 100 is substantially prevented in the coupling 10 according to the invention because the first and second bulbous rims 76 and 78 engage respective capture surfaces 32 on the first and second sidewalls 20 and 22 of the segments. Contact between the bulbous rims 76 and 78 and the capture surfaces 32, with their angular orientation 34 has been found to act as an anti-rotation feature and thereby inhibit gasket dislodgement upon pipe insertion. The combination gasket 70 and coupling 10 achieve significantly more stability upon pipe element insertion, allowing both pipe elements to be readily inserted into the coupling 10 when in the preassembled state. The respective relief surfaces 40 when present on the sidewall surfaces 20 and 22, with their larger orientation angles act to guide the gasket 70 into the desired engagement to achieve the preassembled state. FIG. 9 shows both pipe elements 100 and 102 inserted into the central space 16, and the segments 12 and 14 (14 shown) drawn together with their keys 46 and 48 engaging circumferential grooves 104 and 106 to provide mechanical engagement. The gasket 70 is compressed between the segments 12, 14 (14 shown) and the pipe elements 100, 102, the sealing surfaces 86 and 88 engaging the pipe elements as a result to effect a fluid tight seal. Deformation of gasket 70 may be accommodated by a cavity 108 which extends along the back wall 18, the concave shape of the web 72 deforming into a convex shape and thereby permitting the leg 96 to retract from between the pipe elements 100, 102 and not intrude into the fluid flow path.

Figure 10:
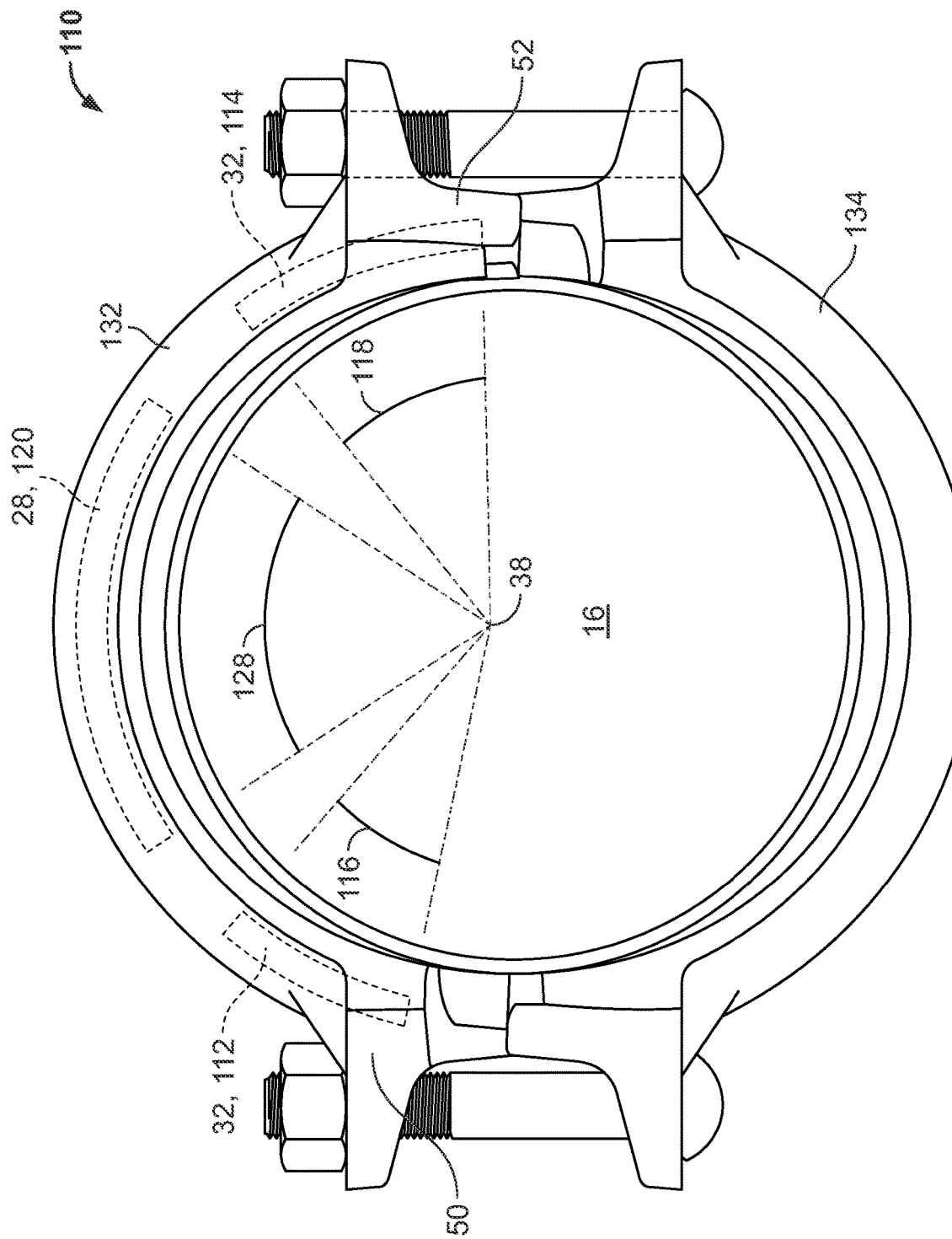
FIG. 10 is an axial view showing another example embodiment of a coupling according to the invention.
Figure 11:
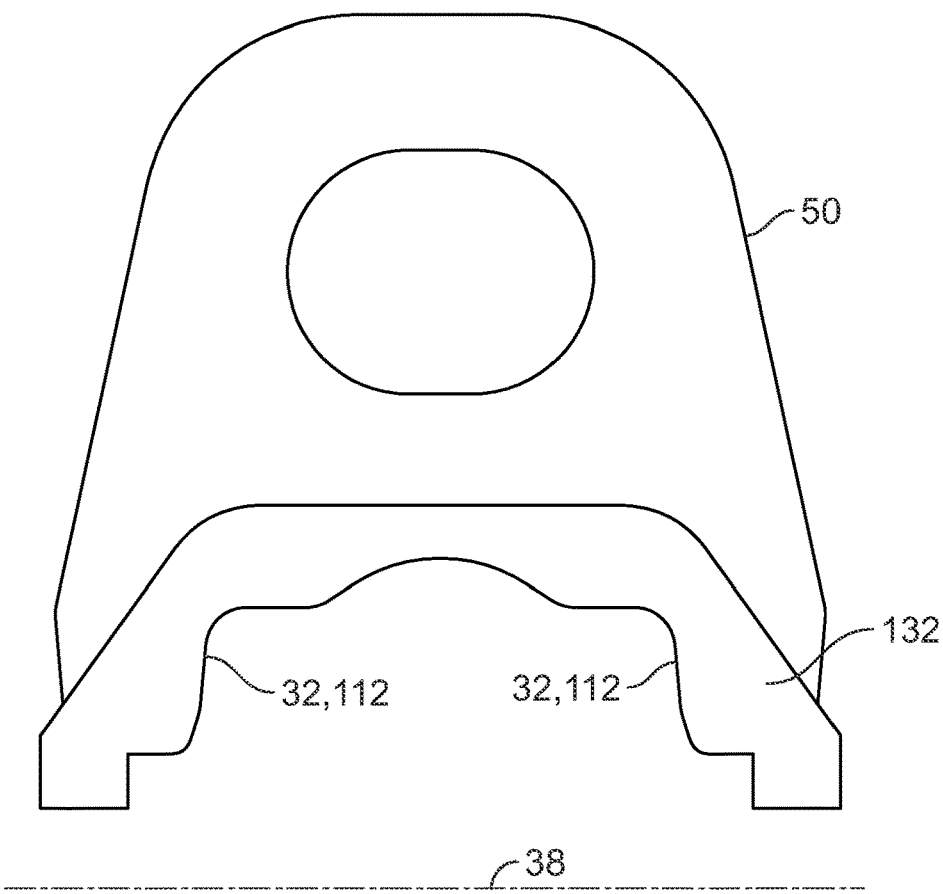
FIG. 11 shows a cross sectional view of an example coupling segment taken at a point proximate to an adjustable attachment assembly.

FIG. 10 shows another example embodiment of a coupling 110 according to the invention and comprising segments 132 and 134. As shown in FIGS. 10 and 11, the capture surfaces 32 of coupling 110 comprise first and second portions 112, 114. The first capture surface portions 112 are positioned proximate to the first adjustable attachment assembly 50, and the second capture surface portions 114 are positioned proximate to the second adjustable attachment assembly 52 (only capture surface portions 112 shown in FIG. 11). In this example embodiment the first capture surface portions 112 subtend an angle 116 extending from the end of coupling segment 132 and ranging from about 25° to about 45° along the arc length of the segment. Similarly, the second capture surface portions 114 subtend an angle 118 extending from the opposite end of segment 132 and ranging from about 25° to about 45° along the arc length of the segment. Subtended angles 116 and 118 are measured about the longitudinal axis 38.

Figure 12:
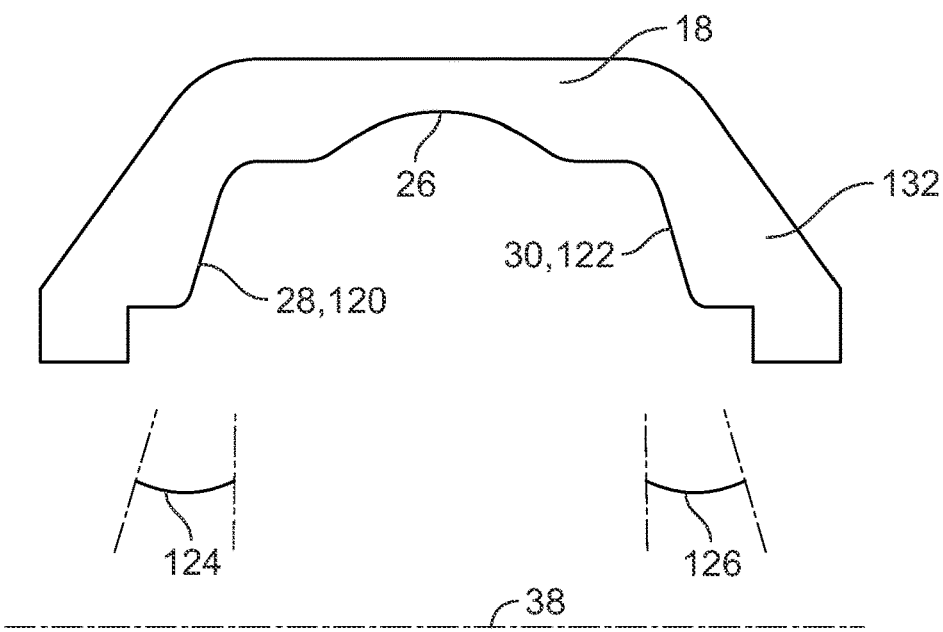
FIG. 12 shows a cross sectional view of an example coupling segment taken at a point approximately midway between the ends of the segment.

As shown in FIGS. 10 and 12, the first and second side surfaces 28 and 30 further comprise respective first and second support surfaces 120 and 122. Support surfaces 120 and 122 are positioned adjacent to the segment's back surface 26. As shown in FIG. 10, the first support surface 120 is positioned between the first and second capture surface portions 112 and 114 on the first side surface 28. Similarly, the second support surface 122 is positioned between the first and second capture surface portions on the second side surface 30 (not visible). In this example embodiment, the first support surface 120 subtends an angle 128 ranging from about 90° to about 110° measured about the longitudinal axis 38. Similarly, the second support surface 122 may also subtend an angle ranging from about 90° to about 110° measured about the longitudinal axis 38. As shown in a comparison of FIGS. 11 and 12, the first support surfaces 120, 122 have respective orientation angles 124 and 126 which are different from the orientation angles of the first and second capture surface portions 112, 114 (see, for comparison, FIG. 4A). In this example embodiment the first and second support surfaces 120, 122 each have a respective orientation angle 124, 126 ranging from about 15° to about 30° measured from respective first and second reference lines extending radially from the longitudinal axis 38. Although not expressly described above, segment 134 may also be the same as segment 132.

Figure 13:
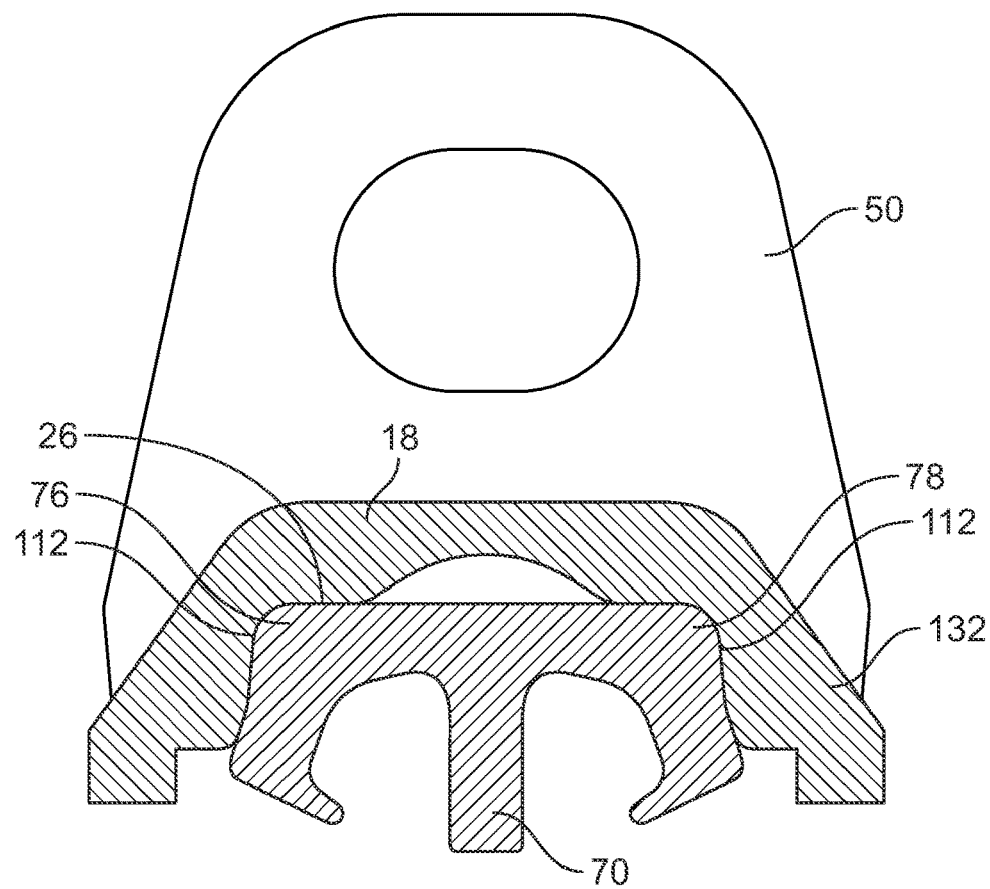
FIG. 13 shows a cross sectional view of an example coupling segment and gasket taken at a point proximate to an adjustable attachment assembly.
Figure 14:
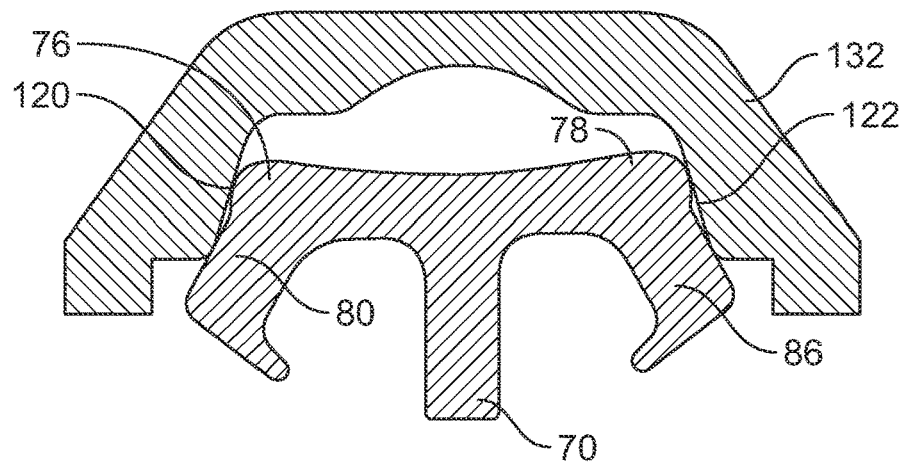
FIG. 14 shows a cross sectional view of an example coupling segment and gasket taken at a point approximately midway between the ends of the segment.

FIGS. 13 and 14 are cross sectional views of a segment 132 which illustrate the engagement of the gasket 70 with the capture surface portions (112 shown) and the support surfaces 120 and 122 when the coupling is in the factory preassembled state such that the segments 132, 134 are maintained in spaced relation from one another sufficient to permit insertion of a pipe element or elements into the central space 16 while the segments are attached to one another end to end surrounding the central space 16 as shown in FIG. 10. As shown in FIG. 13, the web 72 and the first and second bulbous rims 76, 78 of gasket 70 engage the back surface 26 of back walls 18 of the segments 132, 134 (132 shown) along the first and second capture surface portions 112 and 114 (112 shown). The section cut of FIG. 13 is taken near the attachment assembly 50 within the arc length of the angle 116 subtended by the capture surface portions 112. Gasket 70 is substantially seated within the segments 132, 134 over these regions of the coupling 110 to prevent dislodgement of the gasket upon pipe element insertion as explained above. FIG. 14 is a section cut taken between the ends of the segments 132 or 134 within the arc length of the angle 128 subtended by the support surfaces 120, 122. In this region the first lobe 80 and the first bulbous rim 76 of the gasket 70 engage the first support surface 120 and the second lobe 86 and the second bulbous rim 78 engage the second support surface 122. It is expected that this engagement of gasket 70 with support surfaces 120 and 122 will maintain the segments 132 and 134 of coupling 110 in spaced apart relation during shipping and handling even when a coupling is compressed by the weight of other couplings also in the shipping container.

All of the embodiments of the claimed invention described herein are provided expressly by way of example only. Innumerable variations and modifications may be made to the example embodiments described herein without departing from the concept of this disclosure. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A coupling for joining pipe elements, said coupling comprising:
    a plurality of segments attached to one another end to end surrounding a central space for receiving said pipe elements, each said segment comprising a casting having:
    a back wall;
    first and second sidewalls attached to said back wall on opposite sides thereof, said back wall and said sidewalls defining a channel, said back wall defining a back surface facing said central space, said sidewalls defining respective first and second side surfaces facing said channel, each said side surface comprising:
a capture surface adjacent to said back surface and configured to engage a gasket positioned within the channel, each said capture surface having an orientation angle of 10° or less measured from a reference line extending radially from a longitudinal axis arranged coaxially with said segments through said central space, and each said segment further comprising:
first and second adjustable attachment assemblies located at opposite ends of said segments for adjustably attaching said segments to one another in end to end relation,
wherein each said capture surface comprises a first and a second portion, said first capture surface portions being positioned proximate to said first adjustable attachment assembly, said second capture surface portions being positioned proximate to said second adjustable attachment assembly.

2. The coupling according to claim 1, wherein said orientation angle of said capture surfaces ranges from 10° to 1°.

3. The coupling according to claim 1, wherein said orientation angle of said capture surface is 5°.

4. The coupling according to claim 1, wherein said capture surface comprises from 50% to 100% of a depth of each of said first and second sidewalls.

5. The coupling according to claim 1, wherein said capture surface comprises 50% of a depth of each of said first and second sidewalls.

6. The coupling according to claim 1, comprising at most a first and a second of said segments, wherein said first adjustable attachment assembly on said first segment is in facing relation with said first adjustable attachment assembly on said second segment and said second adjustable attachment assembly on said first segment is in facing relation with said second adjustable attachment assembly on said second segment.

7. The coupling according to claim 6, wherein each said attachment assembly comprises:
a respective lug defining an opening;
a respective adjustable fastener received within said openings; wherein
said fasteners extend between said lugs for adjustably attaching said segments to one another.

8. The coupling according to claim 1, wherein said first capture surface portion subtends an angle ranging from 25° to 45° and said second capture surface portion subtends an angle ranging from 25° to 45° measured about said longitudinal axis.

9. The coupling according to claim 1, wherein each said first and second side surface further comprises respective first and second support surfaces adjacent to said back surface, said first support surface being positioned between said first and second capture surface portions on said first side surface, said second support surface being positioned between said first and second capture surface portions on said second side surface, said first support surface having an orientation angle different from said orientation angles of said first and second capture surface portions on said first side surface, said second support surface having an orientation angle different from said orientation angles of said first and second capture surface portions on said second side surface.

10. The coupling according to claim 9, wherein said first and second support surfaces each have an orientation angle ranging from 15° to 30° measured from respective first and second reference lines extending radially from said longitudinal axis.

11. The coupling according to claim 10, wherein said first support surface subtends an angle ranging from 90° to 110° measured about said longitudinal axis and said second support surface subtends an angle ranging from 90° to 110° measured about said longitudinal axis.

12. The coupling according to claim 9, further comprising a gasket, said gasket comprising:
a web forming a circular loop received within said channel;
a first bulbous rim extending circumferentially around a first side of said web, said first bulbous rim projecting toward said back wall and said first sidewall;
a second bulbous rim extending circumferentially around a second side of said web opposite to said first side, said second bulbous rim projecting toward said back wall and said second sidewall;
a first lobe attached to said first side of said web, said first lobe extending circumferentially around said loop and projecting toward said central space, said first lobe defining a first sealing surface at a free end thereof, said first sealing surface being engageable with one of said pipe elements received within said central space;
a second lobe attached to said second side of said web, said second lobe extending circumferentially around said loop and projecting toward said central space, said second lobe defining a second sealing surface at a free end thereof, said second sealing surface being engageable with one of said pipe elements received within said central space.

13. The coupling according to claim 12, wherein, when said coupling is in a factory preassembled state:
said web and said first and second bulbous rims engage said back surfaces of said segments along said first and second capture surface portions; and
said first lobe and said first bulbous rim engages said first support surface and said second lobe and said second bulbous rim engages said second support surface; wherein
engagement between said gasket and said segments supports said segments in said factory preassembled state such that said segments are maintained in spaced relation from one another sufficient to permit insertion of said pipe elements into said central space while said segments are attached to one another end to end surrounding said central space.

14. The coupling according to claim 9, wherein said first capture surface portion subtends an angle ranging from 25° to 45° and said second capture surface portion subtends an angle ranging from 25° to 45° measured about said longitudinal axis.

15. A coupling for joining pipe elements, said coupling comprising:
a plurality of segments attached to one another end to end surrounding a central space for receiving said pipe elements, each said segment comprising a casting having:
a back wall;
first and second sidewalls attached to said back wall on opposite sides thereof, said back wall and said sidewalls defining a channel, said back wall defining a back surface facing said central space, said sidewalls defining respective first and second side surfaces facing said channel, each said side surface comprising:

a capture surface adjacent to said back surface and configured to engage a gasket positioned within the channel, each said capture surface having an orientation angle of 10° or less measured from a reference line extending radially from a longitudinal axis arranged coaxially with said segments through said central space, and each said segment further comprising first and second adjustable attachment assemblies located at opposite ends of said segments for adjustably attaching said segments to one another in end to end relation, wherein each said segment comprises a relief surface contiguous with said capture surface, said relief surface having an orientation angle greater than 5° measured from a reference line extending radially from said longitudinal axis.

16. The coupling according to claim 15, wherein said orientation angle of said relief surface ranges from 5° to 10°.

17. The coupling according to claim 15, wherein said relief surface comprises from 75% to 0% of a depth of each of said first and second sidewalls.

18. The coupling according to claim 15, wherein said relief surface comprises 50% of a depth of each of said first and second sidewalls.

19. A coupling for joining pipe elements, said coupling comprising:

a plurality of segments attached to one another end to end surrounding a central space for receiving said pipe elements, each said segment comprising a casting having:

a back wall;

first and second sidewalls attached to said back wall on opposite sides thereof, said back wall and said sidewalls defining a channel, said back wall defining a back surface facing said central space, said sidewalls defining respective first and second side surfaces facing said channel, each said side surface comprising:

a capture surface adjacent to said back surface and configured to engage a gasket positioned within the channel, each said capture surface having an orientation angle of 10° or less measured from a reference line extending radially from a longitudinal axis arranged coaxially with said segments through said central space, and each said segment further comprising:

first and second adjustable attachment assemblies located at opposite ends of said segments for adjustably attaching said segments to one another in end to end relation, a first contact surface positioned adjacent to said first attachment assembly;

a second contact surface positioned adjacent to said second attachment assembly, said first contact surface on said first segment being in facing relation with said first contact surface on said second segment, and said second contact surface on said first segment being in facing relation with said second contact surface on said second segment; wherein said first and second contact surfaces are angularly oriented and have opposite slopes such that contact between said first and second contact surfaces causes said segments to rotate in opposite directions to one another about a rotation axis perpendicular to said longitudinal axis.

20. A coupling for joining pipe elements, said coupling comprising:

a plurality of segments attached to one another end to end surrounding a central space for receiving said pipe elements, each said segment comprising a casting having:

a back wall;

first and second sidewalls attached to said back wall on opposite sides thereof, said back wall and said sidewalls defining a channel, said back wall defining a back surface facing said central space, said sidewalls defining respective first and second side surfaces facing said channel, each said side surface comprising:

a capture surface adjacent to said back surface and configured to engage a gasket positioned within the channel, each said capture surface having an orientation angle of 10° or less measured from a reference line extending radially from a longitudinal axis arranged coaxially with said segments through said central space, and each said segment further comprising first and second adjustable attachment assemblies located at opposite ends of said segments for adjustably attaching said segments to one another in end to end relation, said coupling further comprising a gasket, said gasket comprising:

a web forming a circular loop received within said channel;

a first bulbous rim extending circumferentially around a first side of said web, said first bulbous rim projecting toward said back wall and said first sidewall;

a second bulbous rim extending circumferentially around a second side of said web opposite to said first side, said second bulbous rim projecting toward said back wall and said second sidewall;

a first lobe attached to said first side of said web, said first lobe extending circumferentially around said loop and projecting toward said central space, said first lobe defining a first sealing surface at a free end thereof, said first sealing surface being engageable with one of said pipe elements received within said central space;

a second lobe attached to said second side of said web, said second lobe extending circumferentially around said loop and projecting toward said central space, said second lobe defining a second sealing surface at a free end thereof, said second sealing surface being engageable with one of said pipe elements received within said central space; wherein said first bulbous rim engages said capture surface on said first side surface and said second bulbous rim engages said capture surface on said second side surface thereby supporting said segments in a factory preassembled state such that said segments are supported in spaced relation from one another sufficient to permit insertion of said pipe elements into said central space while said segments are attached to one another end to end surrounding said central space.

21. The coupling according to claim 20, further comprising a leg positioned between said first and second lobes, said leg projecting from said web toward said central space.

22. The coupling according to claim 21, wherein said leg further comprises a plurality of discrete tabs positioned on an inner perimeter of said leg and projecting toward said central space, said tabs being arranged in spaced relation from one another along said inner perimeter.

23. The coupling according to claim 22, wherein said tabs have a curved profile.

24. The coupling according to claim 20, wherein said web has a perimetral surface facing away from said central space, said perimetral surface being concave.

25. The coupling according to claim 20, further comprising first and second glands extending respectively from said first and second lobes.

26. The coupling according to claim 20, wherein said first and second bulbous rims extend continuously about said first and second sides of said web respectively.

27. A gasket, said gasket comprising:
a web forming a circular loop surrounding a central space;
a first bulbous rim extending circumferentially around a first side of said web, said first bulbous rim having an outer surface and projecting both radially and axially from said first side of said web with respect to an axis arranged coaxially with said circular loop;
a second bulbous rim extending circumferentially around a second side of said web opposite to said first side, said second bulbous rim having an outer surface and projecting both radially and axially from said second side of said web with respect to said axis;
a first lobe attached to said first side of said web and said first bulbous rim, said first lobe extending circumferentially around said loop and projecting toward said central space, said first lobe defining a first sealing surface at a free end thereof;
a second lobe attached to said second side of said web and said second bulbous rim, said second lobe extending circumferentially around said loop and projecting toward said central space, said second lobe defining a second sealing surface at a free end thereof, said first lobe comprising an outer surface facing away from said second lobe, said second lobe comprising an outer surface facing away from said first lobe; wherein absent deformation of the gasket, in a cross-sectional plane containing said axis, said outer surface of said first bulbous rim meets said outer surface of said first lobe at a first obtuse angle, and said outer surface of said second bulbous rim meets said outer surface of said second lobe at a second obtuse angle.

28. The gasket according to claim 27, further comprising a leg positioned between said first and second lobes, said leg projecting from said web toward said central space.

29. The gasket according to claim 28, wherein said leg further comprises a plurality of discrete tabs positioned on an inner perimeter of said leg and projecting toward said central space, said tabs being arranged in spaced relation from one another along said inner perimeter.

30. The coupling according to claim 29, wherein said tabs have a curved profile.

31. The gasket according to claim 27, wherein said web has a perimetral surface facing away from said central space, said perimetral surface being concave.

32. The gasket according to claim 27, further comprising first and second glands extending respectively from said first and second lobes.

33. The gasket according to claim 27, wherein said first and second bulbous rims extend continuously about said first and second sides of said web respectively.

34. The gasket according to claim 27, wherein, in said cross-sectional plane containing said axis:
said outer surface of said first bulbous rim comprises a convex shape, and
said outer surface of said second bulbous rim comprises a convex shape.

* * * * *